May 19, 1925. 1,538,300
J. C. RANEY
BRIAR KNIFE AND BRUSH HOOK
Filed Feb. 28, 1924
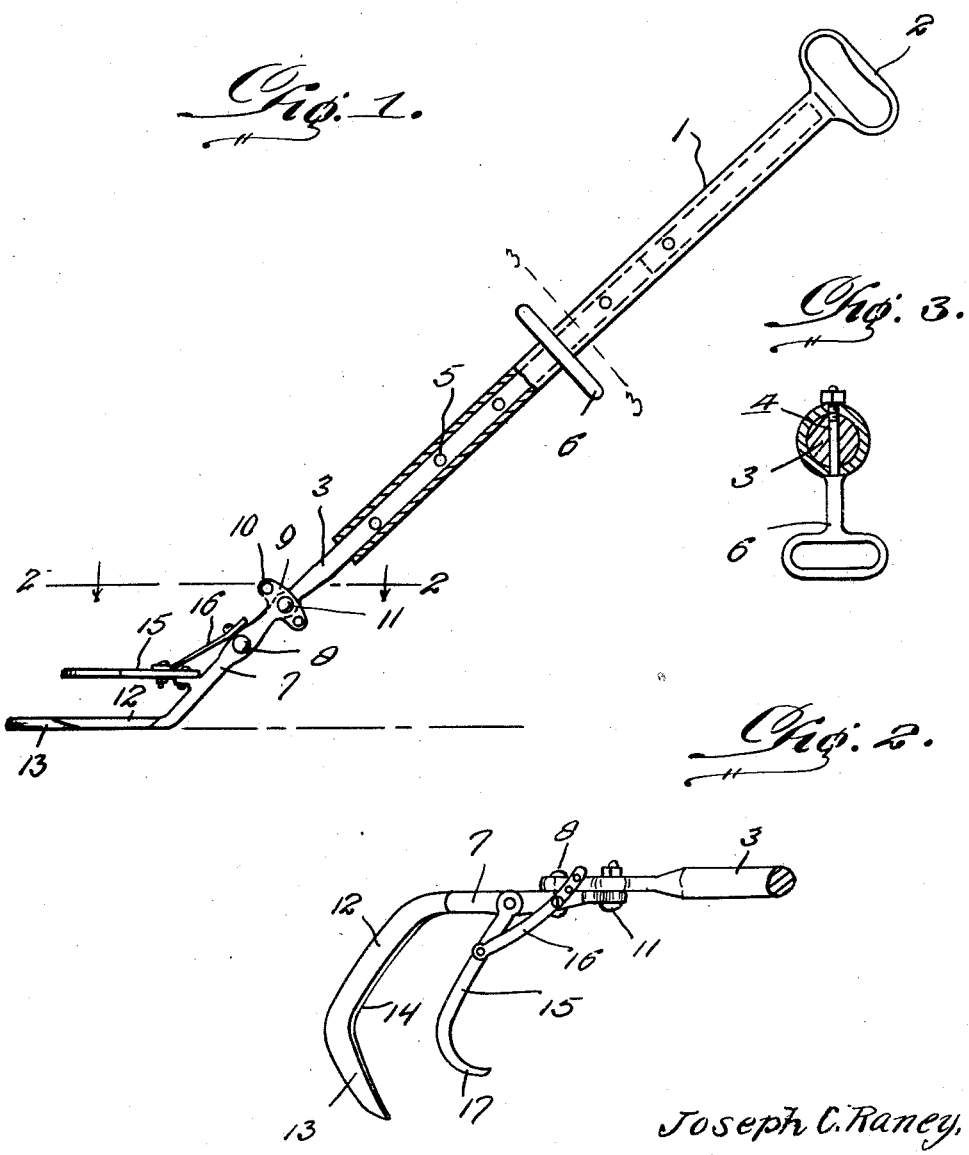
Joseph C. Raney,
Inventor Patented May 19, 1925.

1,538,300

UNITED STATES PATENT OFFICE.

JOSEPH C. RANEY, OF CHADWICK, MISSOURI.

BRIAR KNIFE AND BRUSH HOOK.

Application filed February 28, 1924. Serial No. 695,763.

*To all whom it may concern:*

Be it known that I, JOSEPH C. RANEY, a citizen of the United States, residing at Chadwick, in the county of Christian and State of Missouri, have invented certain new and useful Improvements in Briar Knives and Brush Hooks, of which the following is a specification.

This invention relates to briar knife and brush hook structures and it consists in the novel features hereinafter described and claimed.

An object of the invention is to provide an implement of the character stated having a knife blade which will lie flat upon the surface of the ground when the handle is disposed at an angle of approximately forty five degrees thereto and while the implement is being used for cutting briars or brush. Therefore the operator who is using the implement may stand erect.

A further object of the invention is to provide a blade and blade supporting means of relative arrangement whereby the edge of the blade will sever the briars and brush with a shearing cut and thereby facilitate the cutting action or operation.

A still further object of the invention is to provide the implement with a guard structure which will prevent the briars and brush from striking the hands or body of the operator during the cutting operation.

In the accompanying drawing:—

Figure 1 is a side elevation of the briar knife and brush hook with parts thereof shown in section, Figure 2 is a plan view of an end portion of the implement, with the handle shank thereof cut on the section line 2—2, as shown in Figure 1, Figure 3 is a transverse sectional view of the handle and shank of the implement cut on the line 3—3 of Figure 1.

The combined briar knife and brush hook comprises a hollow handle member 1 having at its outer end a hand grip 2. The grip 2 is in the form of a loop. A shank member 3 is slidably received in the handle member 1 and may be secured at an adjusted position therein by means of a bolt 4 which passes transversely through the handle member 1 and which may be inserted through any one of the perforations 5 with which the shank 3 is provided. A handle grip 6 is mounted upon the bolt 3 and stands out from the sides of the handle member 1. The grip 6 is also in the form of a loop and is disposed in a plane at a right angle to the plane in which the handle grip 2 lies. An arm 7 is pivoted at the point 8 to the lower end of the shank 3 and the arm 7 is provided with a transversely disposed head portion 9 having a series of openings 10, any one of which may receive a bolt 11 which passes transversely through the shank 3 and hinged means are provided for adjusting the arms 7 angularly with relation to the shank 3. A blade 12 is carried by the arm 7 and is disposed in a plane at an obtuse angle to the length of the arm 7. The blade 12 is provided with a hook extremity 13 and a cutting edge 14 traverses the length of the blade 12 and the extremity 13 thereof. A guard member 15 is pivotally mounted upon the arm 7 and lies in a plane above the plane and parallel with that in which the blade 12 lies. A link brace 16 is pivotally connected at one end with the intermediate portion of the guard 15 and is adjustably connected at its other end portion to the upper part of the arm 7. The free end portion of the guard member 15 is rearwardly curved as at 17.

When the implement is in use, the blade 12 and the extremity 13 thereof may be moved over the surface of the ground and the briars or brush may be engaged by the cutting edge 14 and when the cutting edge is pulled toward the operator, the stalks of the briars or brush will strike the guard member and are bent and held down thus preventing the briars and brush from coming in contact with the hands and body of the operator.

The implement may be used for cutting briars and brush from stoney ground and the briars and brush may be trimmed close to the surface without danger of injuring the cutting edge of the knife and its extremity.

Having described the invention, what is claimed as new is:

A briar knife and brush hook comprising a shank, an arm pivoted upon the shank, means for securing the arm at an adjusted position with relation to the shank, a blade carried by the arm, a guard pivoted upon the arm at a point above the blade, and means for adjustably securing the guard with relation to the arm.

In testimony whereof I affix my signature.

JOSEPH C. RANEY.